(12) United States Patent
Pellet et al.

(10) Patent No.: US 7,798,773 B2
(45) Date of Patent: Sep. 21, 2010

(54) AIRFOIL REPLACEMENT REPAIR

(75) Inventors: Paul M. Pellet, Arlington, TX (US); David J. Hiskes, Vernon, CT (US); Orville L. Dunn, Mansfield, TX (US)

(73) Assignee: United Technologies Corporation, Hartford, CT (US)

( * ) Notice: Subject to any disclaimer, the term of this patent is extended or adjusted under 35 U.S.C. 154(b) by 697 days.

(21) Appl. No.: 11/890,388

(22) Filed: Aug. 6, 2007

(65) Prior Publication Data

US 2009/0067987 A1 Mar. 12, 2009

(51) Int. Cl.
*F01D 9/02* (2006.01)
*F01D 25/12* (2006.01)
*B23P 6/00* (2006.01)

(52) U.S. Cl. .......... 415/191; 416/71; 416/191; 415/115; 29/889.722; 29/889.22

(58) Field of Classification Search .......... 415/115, 415/191; 416/71, 97 R, 191; 29/889.2, 889.22, 29/889.1, 889.722
See application file for complete search history.

(56) References Cited

U.S. PATENT DOCUMENTS

| | | | |
|---|---|---|---|
| 2,579,583 A | 12/1951 | Johnson | |
| 3,182,955 A | 5/1965 | Hyde | |
| 3,797,085 A | 3/1974 | Aartman | |
| 3,802,046 A | 4/1974 | Wachtell et al. | |
| 4,176,433 A | 12/1979 | Lee et al. | |
| 4,194,869 A | 3/1980 | Corcokios | |
| 4,305,697 A | 12/1981 | Cohen et al. | |
| 4,326,833 A | 4/1982 | Zelahy et al. | |
| 5,071,054 A | 12/1991 | Dzugan et al. | |
| 5,269,057 A | 12/1993 | Mendham | |
| 5,444,911 A | 8/1995 | Goodwater et al. | |
| 5,465,780 A * | 11/1995 | Muntner et al. | 164/516 |
| 5,690,469 A | 11/1997 | Deal et al. | |
| 5,758,416 A | 6/1998 | Reverman et al. | |
| 5,797,725 A | 8/1998 | Rhodes | |
| 6,154,959 A | 12/2000 | Goodwater et al. | |
| 6,173,491 B1 | 1/2001 | Goodwater et al. | |
| 6,375,415 B1 * | 4/2002 | Burdgick | 415/115 |
| 6,394,750 B1 | 5/2002 | Hiskes | |
| 6,416,278 B1 | 7/2002 | Caddell, Jr. et al. | |
| 6,453,557 B1 * | 9/2002 | Burdgick | 29/889.722 |
| 6,553,665 B2 | 4/2003 | Gunn et al. | |
| 6,685,431 B2 | 2/2004 | Hiskes | |
| 6,785,961 B1 | 9/2004 | Caddell, Jr. et al. | |
| 6,793,457 B2 | 9/2004 | Caddell et al. | |
| 6,905,308 B2 | 6/2005 | Hagle et al. | |
| 7,101,150 B2 | 9/2006 | Bash et al. | |
| RE39,479 E | 1/2007 | Tressler et al. | |
| 2003/0106215 A1 | 6/2003 | Heyward et al. | |

OTHER PUBLICATIONS

C. Tur, "Service Solutions—Engineering Advances Add Up", from GE Engine Service, vol. 3, Issue 5, Sep.-Oct. 2003.
Chromalloy Nevada, "Services-Repair", from http://www.chromalloy-cnv.com/Services.html, visited Apr. 12, 2007 (14 pages).

* cited by examiner

*Primary Examiner*—Igor Kershteyn
(74) *Attorney, Agent, or Firm*—Kinney & Lange, P.A.

(57) ABSTRACT

A method of repairing a vane segment for a gas turbine engine includes removing an engine-run cooling baffle from the vane segment, forming a non-engine-run manufacturing detail that includes an inner platform, an outer platform, and an airfoil, attaching the engine-run cooling baffle to the non-engine-run manufacturing detail, and marking the non-engine-run manufacturing detail with a serial number associated with the vane segment from which the engine-run cooling baffle was removed.

19 Claims, 3 Drawing Sheets

AIRFOIL REPLACEMENT REPAIR

BACKGROUND

The present invention relates to repairs for vane assembly components of gas turbine engines, as well as articles resulting from such repairs.

Gas turbine engines often include a vane nozzle assembly that comprises a plurality of vane segments secured in an annular configuration. Each vane segment can include one or more airfoils positioned in a primary engine gaspath between opposite inner and outer platform structures. These vane segments can also include cooling features, such as film cooling openings and cooling baffles that extend into the airfoils. During operation, the vane segments can become worn, damaged, or otherwise in need of repair or replacement. It is desirable to help minimize costs associated with repair or replacement of vane segments.

SUMMARY

A method of repairing a vane segment for a gas turbine engine includes removing an engine-run cooling baffle from the vane segment, forming a non-engine-run manufacturing detail that includes an inner platform, an outer platform, and an airfoil, attaching the engine-run cooling baffle to the non-engine-run manufacturing detail, and marking the non-engine-run manufacturing detail with a serial number associated with the vane segment from which the engine-run cooling baffle was removed.

DETAILED DESCRIPTION

During use, vane segments for vane nozzle assemblies of gas turbine engines can become worn, damaged, or otherwise in need of repair or replacement. The present invention provides a repair for vane assembly components of gas turbine engines, as well as an article resulting from such a repair. More particularly, the present invention provides a repair where one or more cooling baffles are removed from an engine-run vane segment desired to be repaired and the engine-run vane segment remnant is mutilated as scrap material. An inventory of newly fabricated (i.e., non-engine-run) manufacturing details can be maintained according to anticipated demand, and, in response to a repair request, the one or more salvaged, engine-run cooling baffles are attached to a non-engine-run manufacturing detail. The repaired vane segment is then marked with the part serial number associated with the one or more salvaged, engine-run cooling baffles to maintain serial number traceability through the repair process.

Figure 1:
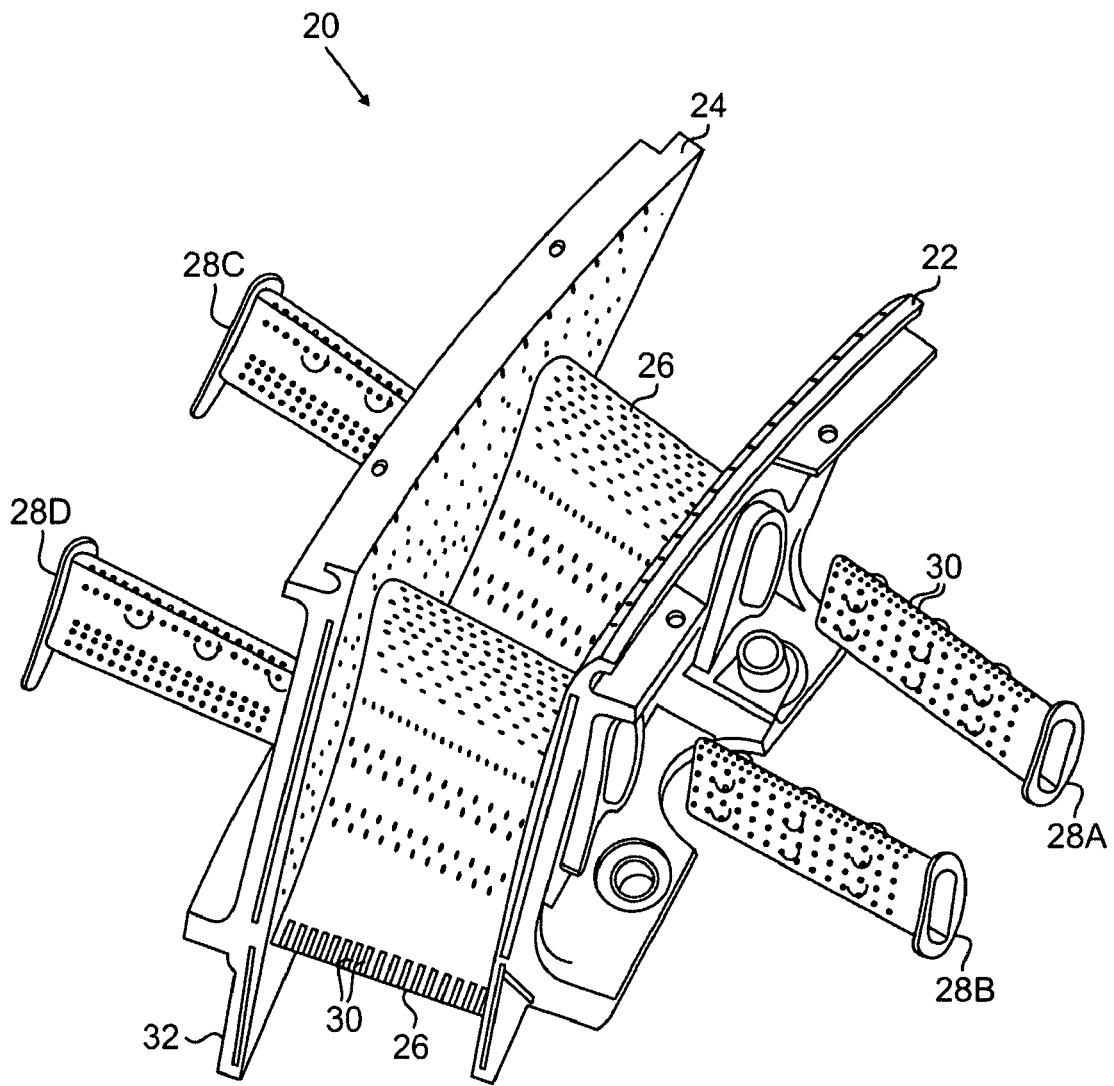
FIG. 1 is an exploded perspective view of a vane segment.
Figure 2:
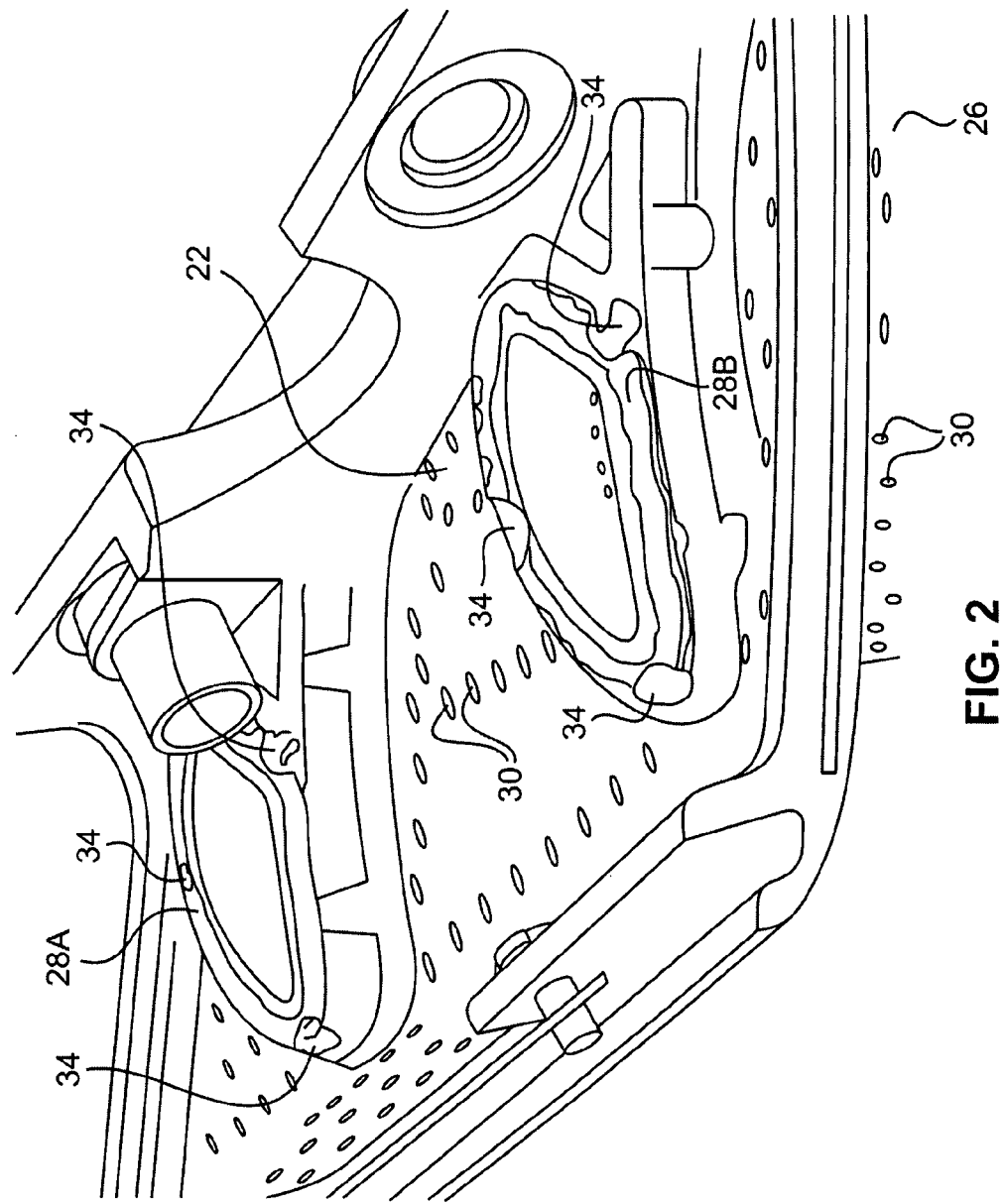
FIG. 2 is a perspective view of a portion of the vane segment of FIG. 1 when fully assembled.

FIG. 1 is an exploded perspective view of a vane segment 20 for use in a gas turbine engine. FIG. 2 is a perspective view of a portion of the vane segment 20 when fully assembled. The vane segment 20 includes an inner platform 22, an outer platform 24, a pair of airfoils 26, and cooling baffles 28A-28D. In one embodiment, the vane segment 20 can be of a type suitable for use in a high pressure turbine (HPT) section of a gas turbine engine, and cooling openings 30 can be formed in selected locations on the vane segment 20 to direct a cooling fluid (e.g., bleed air) as desired. The inner platform 22, the outer platform 24 and the airfoils 26 can each be formed as separate castings (e.g., from a nickel- or cobalt-based superalloy), and then attached together by brazing or other suitable techniques. Conventional coatings (e.g., thermal barrier coatings) can be applied to some or all of the surfaces of the vane segment 20.

The cooling baffles 28A-28D are positioned to extend into hollow, interior portions of the airfoils 26 and function to direct cooling air in a desired manner (e.g., for impingement cooling). The cooling baffles 28A-28D are metallurgically bonded to the airfoils 26, and for that reason are generally not individually serialized but instead are associated with a serial number 32 (not fully visible in FIG. 1) for the entire vane segment 20 that can be marked on the outer platform 24. In the illustrated embodiment, a plurality of tack welds 34 metallurgically bond each cooling baffle 28A-28D to the airfoils 26 (see FIG. 2).

Figure 3:
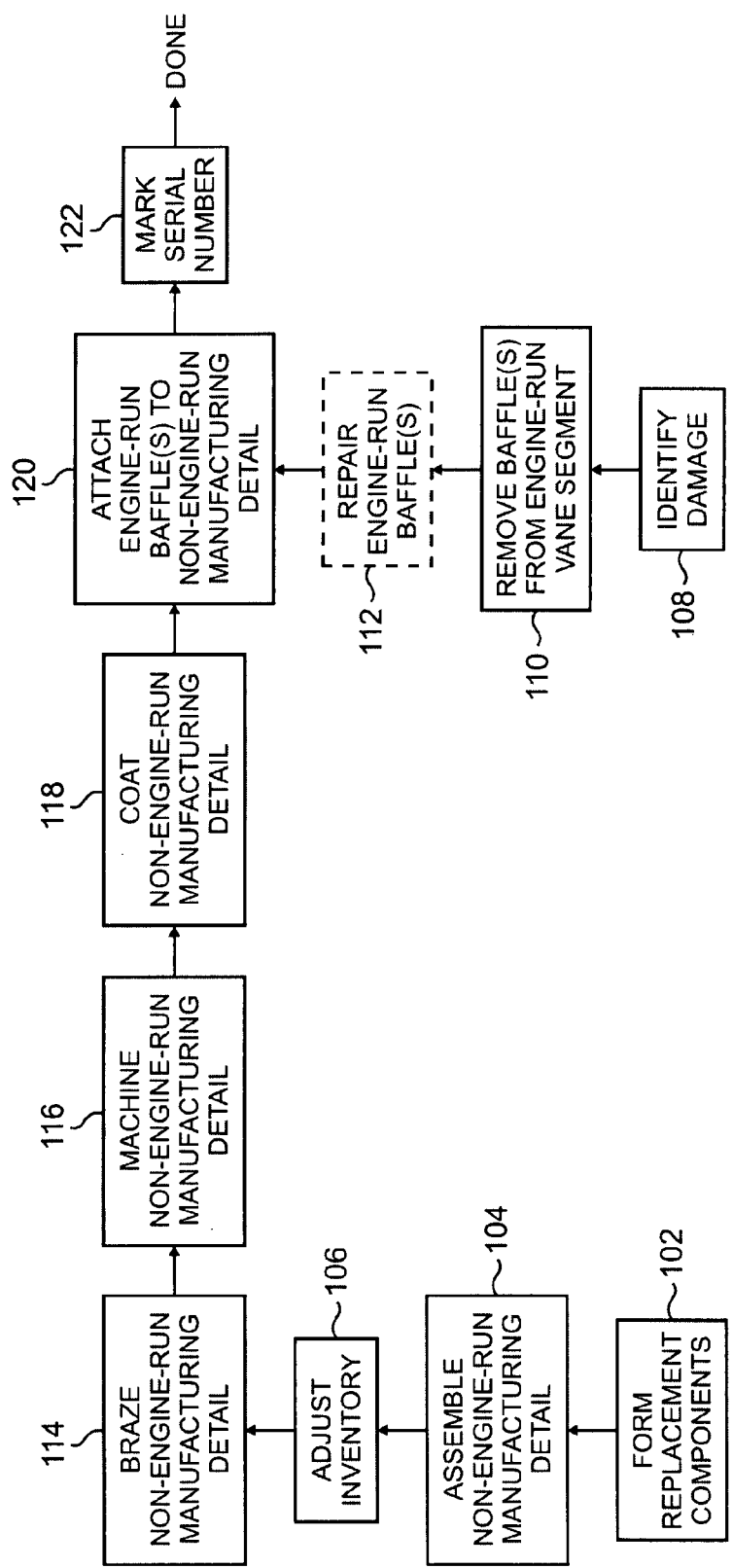
FIG. 3 is a flow chart of a repair method according to the present invention.

During use, the vane segment 20 may become damaged. The damaged vane segment 20 can be repaired according to the present invention. FIG. 3 is a flow chart of a method for repairing an engine-run vane segment that has been removed from a gas turbine engine for repair. Initially, newly-fabricated replacement components are formed (step 102), using new material. The step of forming replacement components (step 102) comprises casting new inner and outer platforms and airfoils as individual structures.

Next, the replacement components are assembled together and connected using brazing or other techniques to form a new, non-engine-run manufacturing detail (step 104). The non-engine-run manufacturing detail includes inner and outer platforms and airfoils configured substantially identically to those of vane segments desired to be repaired. An inventory of manufacturing details can be maintained and adjusted according to anticipated demand for repairs (step 106). By maintaining an inventory of one or more non-engine-run manufacturing details, the time to complete a particular repair after a specific repair request has been received can be shortened.

When a repair request is received, damage to an engine-run vane segment is identified (step 108). One or more cooling baffles are removed from the engine-run vane segment and retained, that is, salvaged (step 110). Because the cooling baffles are often welded in place, grinding (e.g., using carbide or oxide burr techniques), electric discharge machining (EDM), or other machining techniques can be used to break existing welds in order to remove the cooling baffles that are retained. In some circumstances, there may be damage to the salvaged, engine-run baffles. In those instances, repairs on the one or more engine-run baffles can optionally be performed using known techniques (step 112). Moreover, some of the cooling baffles can be replaced with new, non-engine-run baffles. However, at least one engine-run baffle is retained to provide part serial number traceability to the original engine-run vane segment.

After a repair request is received, additional operations are performed on the non-engine-run manufacturing detail that is to be used for the repair. These additional operations can include brazing (step 114), machining (step 116) and coating (step 118). The particular order of these additional operations can vary as desired for particular repairs, and in some embodiments can occur at different times during the overall repair process according to the present invention.

Once the one or more salvaged, engine-run baffles are removed from the engine-run vane segment and repaired as desired (steps 110 and 112) and a non-engine-run manufacturing detail is available with any desired additional operations performed (steps 104, 114, 116 and 118), then the one or more salvaged, engine-run baffles can be attached to the non-engine-run manufacturing detail (step 120). The engine-run baffles can each be attached to the manufacturing detail by tack welding, or with any other processes that produce a metallurgical bond similar to that present with the original engine-run vane segment from which the baffles were removed.

In addition, the non-engine-run manufacturing detail is marked with a part number and part serial number associated with the one or more salvaged, engine-run cooling baffles (step 122). In this way, serial number traceability is maintained to the engine-run vane segment via the engine-run cooling baffles, despite the fact that the baffles are typically not marked and the original physical markings are destroyed through the present repair process. Upon completion of the repair, one or more of the original engine-run cooling baffles are retained, but all other material of the vane segment is essentially replaced with different material of the non-engine-run manufacturing detail.

Repairing existing parts is generally more cost-effective than replacing those parts. Indeed, regulatory agencies that oversee such repairs and replacement parts generally have more stringent requirements for approving replacement parts than for the repair of existing parts. More stringent regulatory requirements raise costs for providers of repairs and/or replacement parts, which, in turn, can result in higher costs for end-users. In that respect, the repair according to the present invention provides benefits in replacing as much of the original engine-run part as possible, particularly vane segment material that bounds an engine's primary gaspath and material that forms mating surfaces, while still maintaining part serial number traceability in order to qualify as a repair.

Although the present invention has been described with reference to preferred embodiments, workers skilled in the art will recognize that changes may be made in form and detail without departing from the spirit and scope of the invention. For instance, the present invention can be applied to vane segments having a variety of different configurations. Moreover, it is not necessary to maintain an inventory of non-engine-run manufacturing details according to the present invention, but, alternatively, a non-engine-run manufacturing detail can be fabricated after a repair request is received.

What is claimed is:

1. A method of repairing a vane segment for a gas turbine engine, the method comprising:

removing an engine-run cooling baffle from the vane segment;

forming a non-engine-run manufacturing detail that includes an inner platform, an outer platform, and an airfoil;

attaching the engine-run cooling baffle to the non-engine-run manufacturing detail; and marking the non-engine-run manufacturing detail with a serial number associated with the vane segment from which the engine-run cooling baffle was removed.

2. The method of claim 1, wherein the step of removing an engine-run cooling baffle from the vane segment comprises removing a welded joint therebetween.

3. The method of claim 2, wherein the welded joint is removed through grinding.

4. The method of claim 2, wherein the welded joint is removed through electric discharge machining.

5. The method of claim 1, wherein the engine-run cooling baffle is attached to the non-engine-run manufacturing detail through welding.

6. The method of claim 1 and further comprising the steps of:

casting the inner platform of the non-engine-run manufacturing detail;

casting the outer platform of the non-engine-run manufacturing detail;

casting the airfoil of the non-engine-run manufacturing detail; and connecting the inner platform, the outer platform and the airfoil together to form the non-engine-run manufacturing detail.

7. The method of claim 6, wherein at least a portion of the non-engine-run manufacturing detail is cast from non-engine-run material.

8. The method of claim 1, wherein the non-engine-run manufacturing detail is provided from an inventory that is available prior to the step of removing an engine-run cooling baffle from the vane segment.

9. The method of claim 1 and further comprising the steps of:

brazing at least a portion of the non-engine-run manufacturing detail;

machining at least a portion of the non-engine-run manufacturing detail; and coating at least a portion of the non-engine-run manufacturing detail.

10. A repaired vane segment apparatus for a gas turbine engine, the apparatus comprising:

a non-engine-run manufacturing detail comprising:
 an inner platform;
 an outer platform; and
 an airfoil;

an engine-run cooling baffle attached to the non-engine-run manufacturing detail; and markings on the repaired vane segment apparatus, wherein the markings provide a serial number associated with a vane segment from which the engine-run cooling baffle was removed.

11. The apparatus of claim 10, wherein the engine-run cooling baffle is inserted into the airfoil of the non-engine-run manufacturing detail.

12. The apparatus of claim 10, wherein the engine-run cooling baffle is welded to the airfoil of the non-engine-run manufacturing detail.

13. The apparatus of claim 10, wherein the markings are provided on the non-engine-run manufacturing detail.

14. A method of repairing vane segments for gas turbine engines, the method comprising:

forming a non-engine-run manufacturing detail that includes an inner platform, an outer platform, and an airfoil;

creating an inventory that includes the non-engine-run manufacturing detail;

identifying a repairable engine-run vane segment;

removing an engine-run cooling baffle from the repairable engine-run vane segment;

attaching the engine-run cooling baffle to the non-engine-run manufacturing detail.

15. The method of claim 14, wherein the step of removing an engine-run cooling baffle from the vane segment comprises removing a welded joint therebetween.

16. The method of claim 14 and further comprising the step of:

marking the non-engine-run manufacturing detail with a serial number associated with the repairable engine-run vane segment from which the engine-run cooling baffle was removed.

17. The method of claim 14 and further comprising the steps of:

casting the inner platform of the non-engine-run manufacturing detail;

casting the outer platform of the non-engine-run manufacturing detail;

casting the airfoil of the non-engine-run manufacturing detail; and connecting the inner platform, the outer platform and the airfoil together to form the non-engine-run manufacturing detail.

18. The method of claim 17, wherein at least a portion of the non-engine-run manufacturing detail is cast from engine-run scrap material.

19. The method of claim 14, wherein the inventory that includes the non-engine-run manufacturing detail is available prior to the step of identifying a repairable engine-run vane segment.

* * * * *